UNITED STATES PATENT OFFICE.

HENRIETTA J. BENDALL, OF JARRATT'S DEPOT, VIRGINIA.

IMPROVEMENT IN COMPOUND SALVES OR PLASTERS FOR THE CURE OF CANCERS.

Specification forming part of Letters Patent No. 123,220, dated January 30, 1872.

*To all whom it may concern:*

Be it known that I, HENRIETTA J. BENDALL, of Jarratt's Depot, in the county of Sussex and State of Virginia, have invented a certain new and useful Improvement in Salve or Plaster for the Cure of Cancers; and I do hereby declare the following to be a full, clear, and exact description of the same.

The object of this invention is to provide for public use an efficacious remedy for cancers and other old and malignant sores and ulcers; and to this end, the invention consists in utilizing the properties of a plant indigenous to the neighborhood of Sussex county, Virginia, and known there as "sour grass" or corniculata, by preparing it for convenient and useful application as a plaster or salve substantially as follows: I gather the herb early in the season before too much sap gets into it, and beat it thoroughly in a porcelain mortar. The juice is then expressed from the macerated pulp and dried in the shade on pewter vessels until it attains nearly the consistency of wax, when it is spread upon thin linen and applied as a plaster to the parts affected.

As a specific for cancers and old sores the properties of this substance, which I propose to furnish to the public under the name of Bendall's Eureka Cancer-Salve, have been very thoroughly tested by me, and it has never failed to effect a cure where it has been applied.

I claim as my invention—

The plaster or salve, prepared as herein described.

HENRIETTA J. BENDALL.

Witnesses:
 WM. H. BASDUNN,
 JOS. H. JARRATT.